(12) United States Patent
Nissen (10) Patent No.: US 8,858,184 B2
(45) Date of Patent: Oct. 14, 2014

(54) ROTOR BLADE EROSION PROTECTION SYSTEM

(75) Inventor: Jeffrey P. Nissen, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 472 days.

(21) Appl. No.: 13/238,873

(22) Filed: Sep. 21, 2011

(65) Prior Publication Data

US 2013/0071252 A1 Mar. 21, 2013

(51) Int. Cl.
*F01D 5/28* (2006.01)
*C23C 4/04* (2006.01)
*B64C 11/20* (2006.01)
*B64D 45/00* (2006.01)

(52) U.S. Cl.
CPC ........... *B64C 11/205* (2013.01); *F05D 2230/90* (2013.01); *C23C 4/04* (2013.01); *Y02T 50/672* (2013.01); *F01D 5/288* (2013.01); *B64D 2045/0085* (2013.01); *F05D 2240/303* (2013.01)
USPC .................................. 416/241 B; 416/241 R (58) Field of Classification Search
CPC .................. F05D 2240/303; F05D 2300/2263; F05D 2300/177; F05D 2300/611; F01D 5/12; F01D 5/28; F01D 5/282; F01D 5/284; F01D 5/286; F01D 5/288
USPC ...... 416/241 R, 241 A, 241 B, 229 R, 223 R, 416/224
See application file for complete search history.

(56) References Cited

U.S. PATENT DOCUMENTS

| | | | | |
|---|---|---|---|---|
| 3,275,295 A | * | 9/1966 | Caldwell et al. | 416/224 |
| 6,132,857 A | * | 10/2000 | Champenois et al. | 428/300.7 |
| 2004/0096331 A1 | * | 5/2004 | Leach | 416/224 |
| 2004/0202885 A1 | | 10/2004 | Seth et al. | |
| 2010/0304107 A1 | * | 12/2010 | Nardi et al. | 428/217 |

FOREIGN PATENT DOCUMENTS

| | | |
|---|---|---|
| EP | 1995412 A2 | 11/2008 |
| EP | 2256228 A2 | 1/2010 |
| EP | 2322427 A2 | 5/2011 |
| FR | 2892732 A1 | 4/2007 |
| WO | 02072420 A1 | 9/2002 |
| WO | 2010051803 A1 | 5/2010 |

OTHER PUBLICATIONS

Canadian Office Action in related Canadian patent application No. 2,788,117, mailed Sep. 30, 2013, 4 pages.
Extended Search Report in European Application No. 11186040.9-2422, dated Feb. 3, 2012, 9 pages.

* cited by examiner

*Primary Examiner* — Edward Look
*Assistant Examiner* — Danielle M Christensen
(74) *Attorney, Agent, or Firm* — James E. Walton; Damon R. Hickman (57) ABSTRACT

The present application includes a rotor blade having an erosion protective coating, the coating being a cermet material configured to protect against erosion during the operation of the rotor blade. Further, the present application includes a method of selectively applying the erosion protective coating, a method of selectively repairing/reapplying the erosion protective coating, and a process of developing an erosion surface model map of an optimized erosion protective coating pattern and thickness.

19 Claims, 7 Drawing Sheets

ROTOR BLADE EROSION PROTECTION SYSTEM

GOVERNMENT LICENSE RIGHTS

This invention was made with government support under the Advanced Erosion Protection Contract, No. 2106345, awarded by The Office of Naval Research. The government has certain rights in the invention.

BACKGROUND

1. Field of the Invention

The present application relates to an optimized and repairable rotor blade erosion protection system.

2. Description of Related Art

Aircraft rotor blades are susceptible to erosion from particulates, such as sand and rain, during operation. A typical rotor blade can include a sacrificial erosion strip having metal bonded to the leading edge of the rotor blade. As the sacrificial erosion strip wears down, it is removed and replaced with a new strip. These erosion strips are typically made of a metal, such as titanium, nickel, or stainless steel. Such strips are typically a thickness and geometry that provide limited erosion performance, and consequently add unnecessary weight, thereby degrading performance of the rotor blade. Other erosion protection systems have been made of elastomeric material; however, elastomeric materials are typically difficult to correctly apply, do not allow optimization for erosion or rotor performance, and perform poorly in a rain erosion environment.

Although there have been significant developments in rotor blade erosion protection, significant room for improvement remains.

DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, wherein:

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes a rotor blade having an erosion protective coating, a method of selectively applying the erosion protective coating, a method of selectively repairing/reapplying the erosion protective coating, and a process of developing an erosion surface model map of an optimized erosion protective coating pattern and thickness, each of which are further discussed herein.

Figure 1:
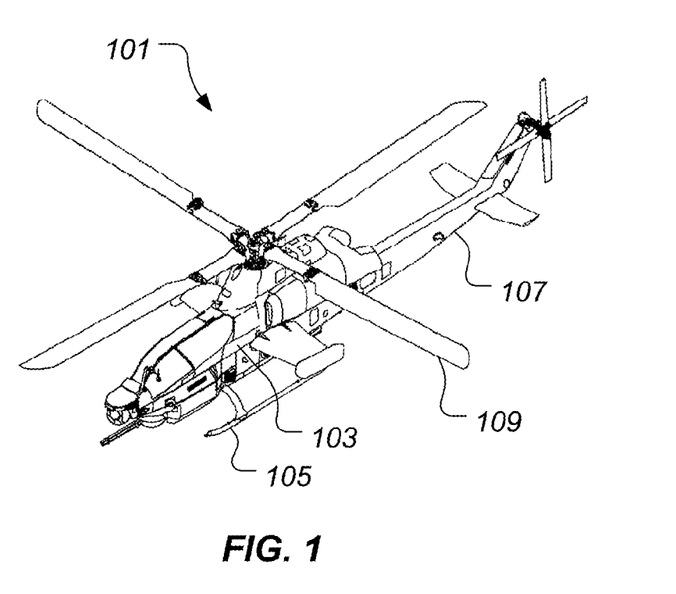
FIG. 1 is a perspective view of a rotorcraft, according to the present application.

Referring to FIG. 1, a rotorcraft 101 is illustrated. Rotorcraft 101 includes a fuselage 103, a landing gear 105, and a tailboom 107. Rotorcraft includes a plurality of rotor blades 109.

Figure 2:
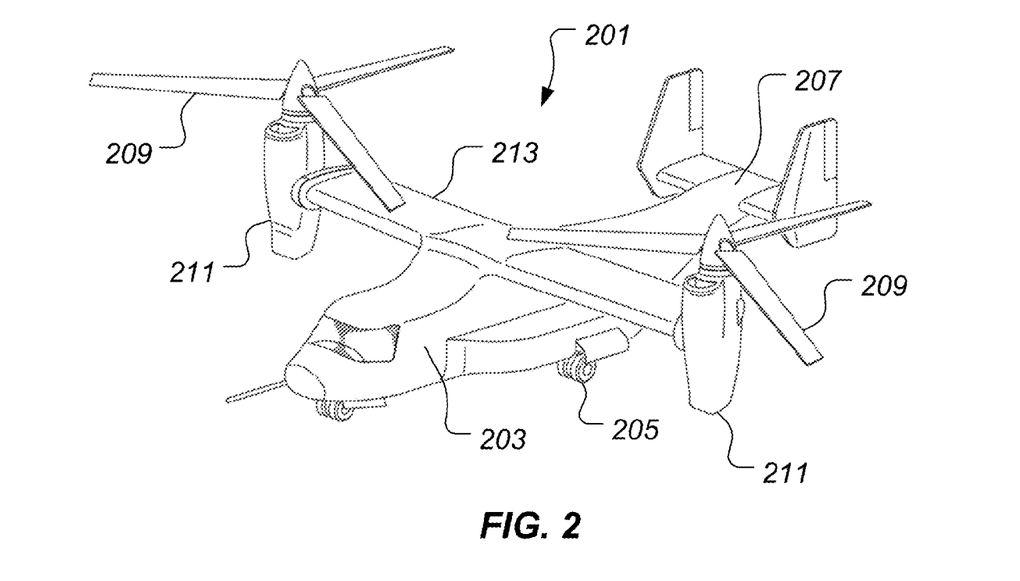
FIG. 2 is a perspective view of a tiltrotor aircraft, according to the present application.

Referring now to FIG. 2, a tiltrotor aircraft 201 is illustrated. Tiltrotor 201 includes a fuselage 203, a landing gear 205, and a tail member 207. A wing 213 has a nacelle 211 located on each end, each nacelle 211 houses a rotor system configured to rotate a plurality of rotor blades 209. Tiltrotor 201 is capable of flying in a helicopter mode, in which each nacelle 211 is positioned approximately vertical, and flying in an airplane mode, in which each nacelle 211 is positioned approximately horizontal.

Rotorcraft 101 and tiltrotor 201 are illustrated as exemplary aircraft that may employ the system of the present application. It should be appreciated any variety of aircraft types may use the system of the present application to protect main rotor blades, tail rotor blades, propellers, or any other airfoil surface susceptible to erosion. Exemplary aircraft types may include an airplane, gyrocopter, and unmanned aircraft, to name a few. Further, wind turbine blades, turbine engine blades, high velocity fan blades, and other similar blade members may also employ the system of the present application to protect against erosion.

Figure 3:
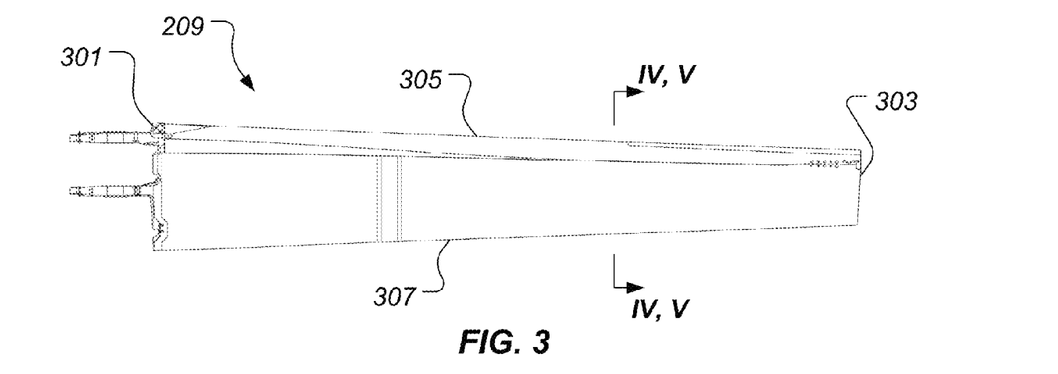
FIG. 3 is a top view of a rotor blade, according to the preferred embodiment of the present application.
Figure 4:
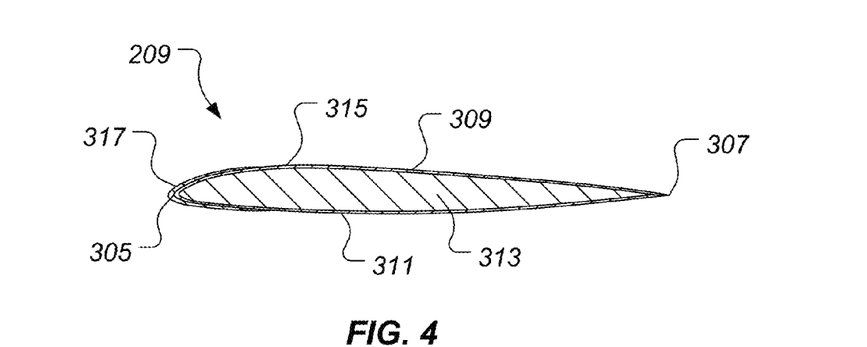
FIG. 4 is a cross-sectional view, taken at section lines IV-IV in FIG. 3.

Referring now to FIGS. 3 and 4, rotor blade 209 is further illustrated. The discussion herein with regard to rotor blade 209 is equally applicable to rotor blade 109, as well as any other airfoil member for which it is desirable to protect against erosion. It should be appreciated that rotor blade 209 may have built-in twist, such that the built-in angle-of-attack is greater near root end 301 as compared to the angle-of-attack toward tip end 303. Other embodiments of rotor blade 209 may have zero built-in twist, such that the angle-of-attack is constant from root end 301 to tip end 303.

The illustrated embodiment of rotor blade 209 includes a skin member 315 around a body member 313. The outer surface of skin member 315 defines the airfoil shape. More specifically, skin member 315 defines a leading edge 305, a trailing edge 307, an upper airfoil surface 309, and a lower airfoil surface 311. In one embodiment, skin member 315 is a titanium sheet formed to the airfoil contour. Further, an embodiment of body member 313 includes an assembly of composite structure providing structural integrity to rotor blade 209. It is well known in the art that rotor blades, such as rotor blade 209, may be assembled with any variety of materials and structures, the specific design being implementation specific. For example, skin member 315 may be a composite material having carbon fiber disposed in an epoxy matrix. Further, even though skin member 315 is illustrated as a unitary member, other embodiments may include skin member 315 divided into segments. For example, skin member 315 may have a leading edge skin member which is separate from portions of skin member 315 that make up the upper, lower, trailing edge surfaces. As such, one embodiment can include a leading edge portion of skin member 315 being a titanium sheet, while the remainder of skin member 315 is of a composite material. Furthermore, body member 313 may include a variety of structures and materials. For example, body member 313 may include a spar that extends in the spanwise direction of the rotor blade 209.

Rotor blade 209 includes an erosion protective coating 317. Coating 317 is preferably sprayed onto the surface of skin member 315. Coating 317 is preferably a cermet material composed of a ceramic material and a metallic material. In regards to coating 317, the cermet material is configured to derive hardness from the ceramic, while deriving ductility from the metal so that the cermet coating binds together and securely bonds to skin member 315. Coating 317 is preferably composed of 60-90% of a hard ceramic, such as a carbide, and 40-10% of a ductile metallic, such as cobalt or nickel. In the preferred embodiment, coating 317 is composed of 90% tungsten carbide and 10% nickel. In an alternative embodiment, coating 317 is composed of 88% tungsten carbide and 12% cobalt. It should be appreciated that alternative compositions of the cermet material are suitable, the exact composition being implementation specific.

Coating 317 is preferably applied to skin member 315 with a thermal spray process. For example, a high velocity oxygen fueled (HVOF) spray machine can be used to spray the cermet material onto skin member 315. In such a process, the HVOF sprayer uses a fuel and oxygen combustion to accelerate a powder mixture of the cermet material at such a high speed (above speed of sound) so that the powder cermet material partially melts and is mechanically deposited onto the skin member 315. It the preferred embodiment, a programmable robot is used to operate the sprayer and deposit the desired about of cermet material onto skin member 315. As discussed further herein, the robot can be programmed to deposit the cermet coating material so as to achieve an implementation specific footprint and tapered thickness of coating 317.

Figure 5:
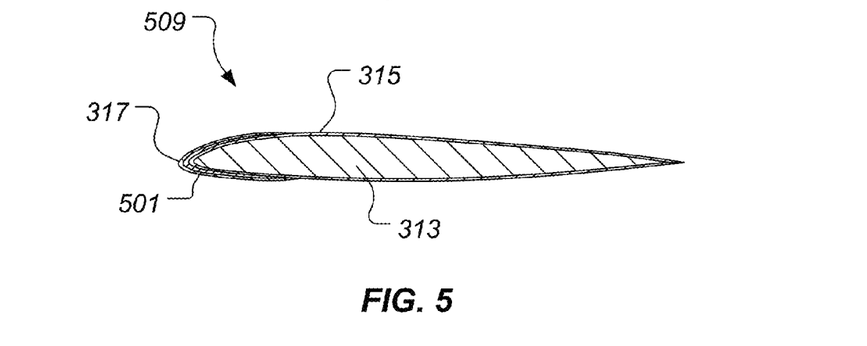
FIG. 5 is a cross-sectional view, taken at section lines V-V in FIG. 3.

Referring now also to FIG. 5, an alternative embodiment rotor blade 509 is illustrated. Rotor blade 509 is substantially similar to rotor blade 209, except for having an additional abrasion resistant layer 501. In the illustrated embodiment, layer 501 is a nickel metal layer. In the illustrated embodiment, coating 317 is also applied directly to layer 501. Further, coating 317 extends beyond layer 501 such that coating 317 is also applied directly to skin member 315. It should be appreciated that coating 317 can be applied to a variety of materials and surfaces of any exterior surface of rotor blade 509. Rotor blade 509 is illustrated in part to describe how coating 317 can be applied onto a variety of substrate structures and materials.

As discussed further herein, the thickness and profile of coating 317 is optimized in accordance with the areas of the rotor blade most susceptible to erosion. The coating 317 is applied at a pattern location and thickness as needed to last a desired life in service, as determined by an erosion surface model map, as discussed further herein. In one embodiment, coating 317 is applied so as to form a tapered thickness increasing spanwise from root end 301 towards tip end 303. Coating 317 is also preferably tapered along the chordwise direction, the coating 317 being thickest at the apex of leading edge and decreasing in the chordwise direction away from the apex toward the trailing edge.

Figure 6:
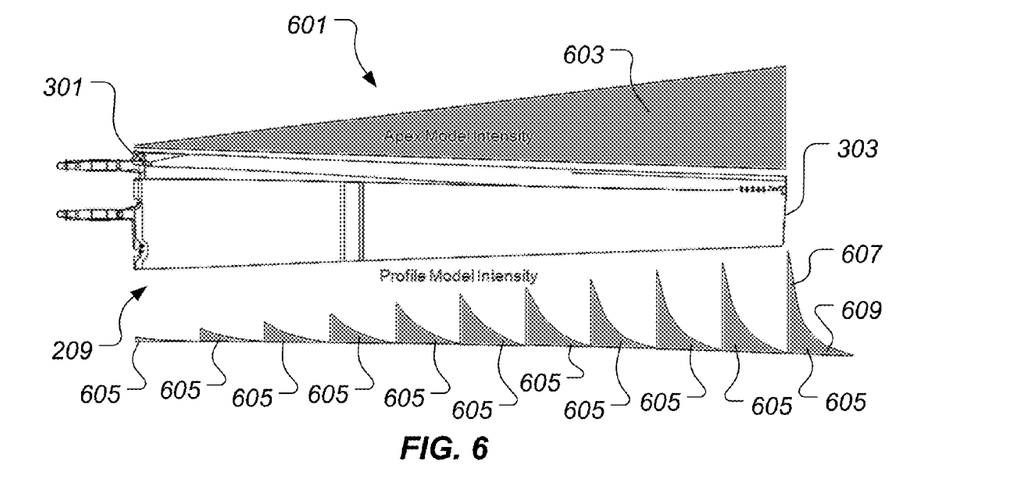
FIG. 6 is a schematic top view of a rotor blade, according to the present application.

Referring now also to FIG. 6, a generalized schematic representation of erosion severity is illustrated as a graph 601. A region 603 is indicative of the erosion severity near the apex, generally increasing spanwise from root end 301 toward tip end 303. Therefore, coating 317 is similarly applied in a tapered geometry to provide the thickest coverage toward tip end 303. Regions 605 are indicative of the erosion severity being the greatest near the apex, or the leading most edge of the airfoil profile, the erosion severity generally decreasing in severity as measured from the apex towards the trailing edge along the upper and lower airfoil surfaces. Each region 605 corresponds with a span location to illustrate how the pattern of coating 317 near root end 301 typically does not extend much beyond the apex; however, the pattern of coating 317 near tip end 303 extends well onto the upper and lower airfoil surfaces away from the apex. Further, coating 317 is similarly applied in a tapered geometry to provide the thickest coverage at the apex, then tapering off along the airfoil surface away from the apex. However, it should be appreciated that in the preferred embodiment, coating 317 is applied in accordance with the indication of erosion severity from an erosion surface model map, the erosion surface model map being an erosion prediction tool that is used to dictate the specific pattern location and thickness of coating 317. For example, in the illustrated embodiment of FIG. 6, an upper airfoil surface region 607 is greater than a lower airfoil surface region 609. As such, the illustrated embodiment has a coating 317 that covers a larger footprint on the upper airfoil surface as compared to the lower airfoil surface. Such an embodiment is exemplary of how the system of the present application applies the pattern and thickness of coating 317 in accordance with the indication of erosion severity from an erosion surface model map.

Figure 7:
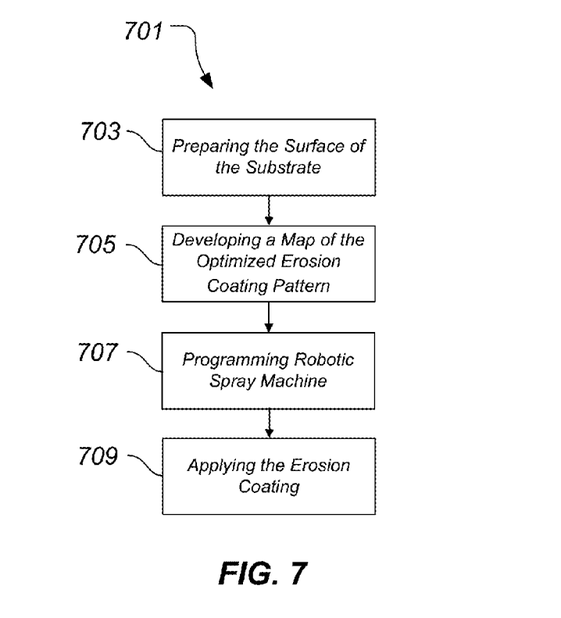
FIG. 7 is a schematic view of a method, according to the present application.

Referring now to FIG. 7, a method 701 of selectively applying the erosion protective coating is schematically illustrated. In the preferred embodiment, the erosion protective coating is a sprayable cermet coating; however, it should be fully appreciated that method 701 may be employed to apply protective coatings other than cermet coatings. Method 701 includes a step 703 which includes preparing the surface of the substrate. The substrate, or outer surface of rotor blade 209, can be prepared by a rather light grit blasting, or even just wiping down the surface with solvent or other cleaning solution. In some embodiments, step 703 is unnecessary due to the ability of the cermet coating to bond well to a variety of substrate materials.

Figure 8:
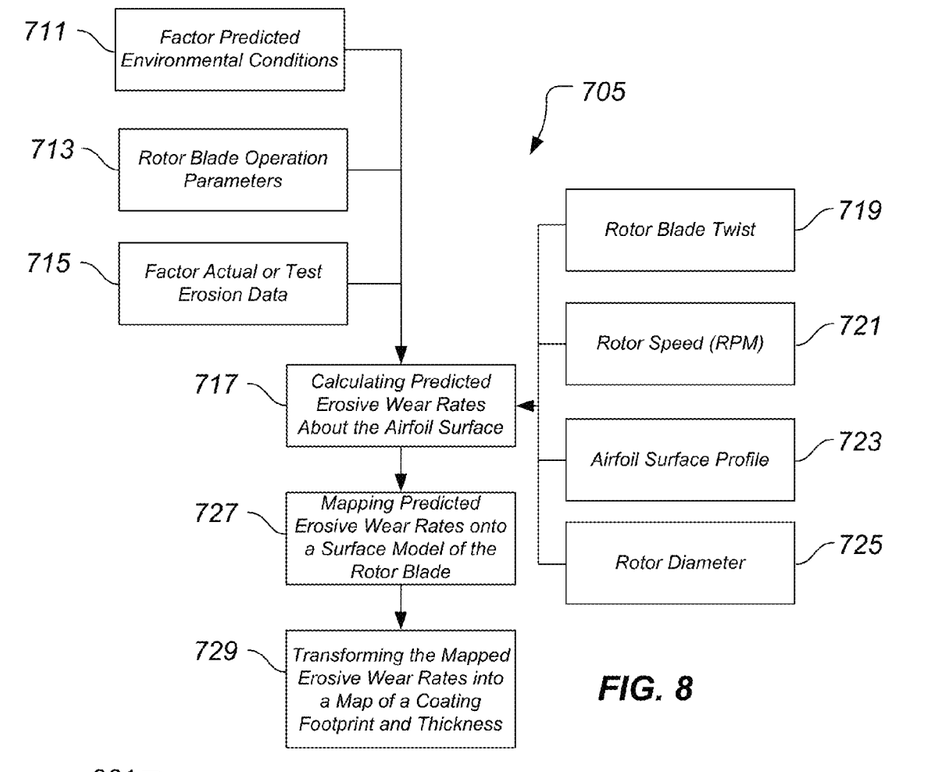
FIG. 8 is a schematic view of a process, according to the present application.

Method 701 further includes a process 705 for developing an erosion surface model map detailing the optimized erosion coating pattern and tapered thicknesses. Referring now also to FIG. 8, process 705 is schematically illustrated in further detail. Process 705 includes a step 717 for calculating predicted erosive wear rates about the airfoil surface. A variety of factors and data may be used in step 717, such as structural, geometric, and operational conditions. For example, a data 719 pertaining to the rotor blade twist may be used in step 717. Further, a data 721 pertaining to the rotor speed can be used since erosive rates are typically higher for higher rotor speeds. A data 723 pertaining to airfoil surface profile is used since the airfoil shape affects the location and severity erosive wear. Further, a data 725 regarding the rotor diameter is used since rotor diameter partially determines the relative velocity at which the rotor blade rotates.

Figure 10:
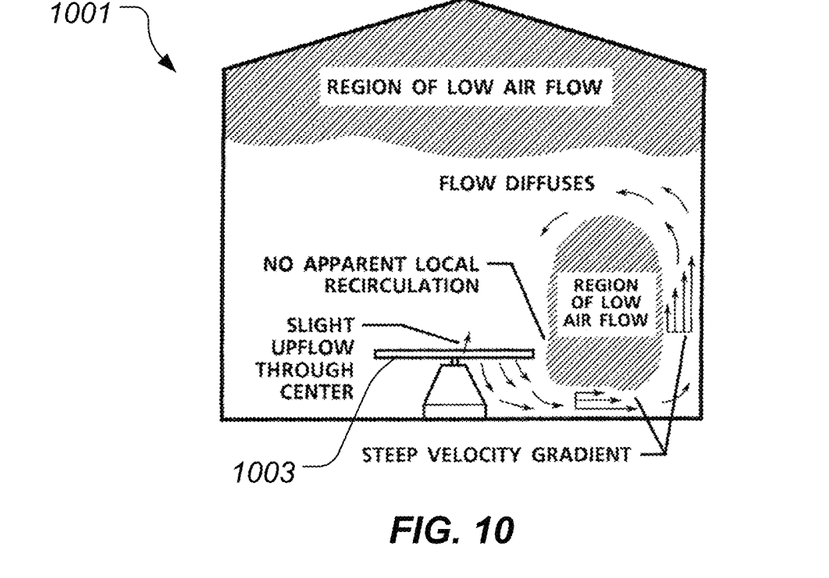
FIG. 10 is a side schematic view of a test rig, according to the present application.

Still referring to FIG. 8, step 717 also takes into account the predicted operational conditions for which the aircraft will be operating in, as schematically represented as a data 711. For example, an aircraft that is predicted to frequently operate in a low altitude sandy environment will experience a higher than average rate of erosive wear. As such, operational conditions are preferably factored into step 717. A data 713 pertaining to rotor blade operational parameters is also considered in step 717. For example, data 713 can include rotor speed, collective position, and altitude, to name a few. As another example of data 713, an aircraft that experiences an above average amount of time running rotors at negative pitch, while on the ground, can experience an above average amount of erosive wear on the upper airfoil surface. In such a scenario, the protective erosive coating can be applied at a larger and thicker footprint on the upper airfoil surface, as compared to the lower airfoil surface. A data 715 pertaining to actual and/or test erosion data can also be factored in step 717. Actual erosion data can be derived from a laser measuring tool, a coordinate measurement machine, or ultrasonic machine to make thickness measurements of erosive wear on an actual rotor blade. The duration (hours) of operation on the rotor blade is also recorded. By periodically measuring erosive wear, while also recording the duration of operation, wear rates can be calculated, thus providing a valuable tool for calculating predicted erosive wear rates in step 717. Further, data 715 can include test erosion data measured in a testing operation. Briefly referring to FIG. 10, a test rig 1001 is illustrated. Test rig 1001 includes a test rotor blade 1003 that is rotated and exposed to particulate matter, such as sand and/or water. Erosion of rotor blade 1003 is periodically measured so as to be able to predict real life erosion rates, thus providing a valuable tool for calculating predicted erosive wear rates in step 717.

Still referring to FIG. 8, process 705 further includes a step 727 for mapping the predicted erosive wear rates, derived in step 717, onto a surface model of the rotor blade. Step 727 can include generating a surface model, such that the airfoil surface geometry of the rotor blade can be divided into a plurality of points or facets, each point or facet having a predicted erosive wear rate. The surface model can be visually depicted in a 3D computer environment with CAD software, such that the surface model is a depiction of the airfoil surface geometry of the rotor blade. A step 729 includes transforming the mapped erosive wear rates into a map, thereby creating an erosion surface model map representing a desired coating footprint and thickness. The coating footprint and thickness is selectively generated to withstand erosion for specified life period. As such, step 729 includes transforming the mapped predicted erosive wear rate into the map of the erosion coating pattern, the map being dependent in part upon the predicted erosive wear rate and a desired life of the erosion protective coating. For example, if the specified life period is 2000 hours, then the coating footprint and thickness is configured to prevent wear penetration until after the aircraft has operated for at least 2000 hours. Moreover, if the specified life period is 5000 hours, the coating footprint and thickness will be larger and thicker, as compared to a coating configured with a life period of 2000 hours.

In the preferred embodiment, process 705 is configured for generating an erosion surface model map representing an optimized coating footprint and thickness, wherein the coating is a cermet coating. However, it should be appreciated that alternative embodiments of process 705 may be employed for determining a coating footprint and thickness for other coatings, as well as non-sprayable erosion protection coatings. For example, the map representing coating footprint and thickness can be used to fabricate a metallic erosion protection member that is bonding onto the exterior surface of a rotor blade. In another embodiment, the map representing coating footprint and thickness can be used to fabricate a molded member, the molded member being any variety of materials that are suited for erosion protection.

Figure 16:
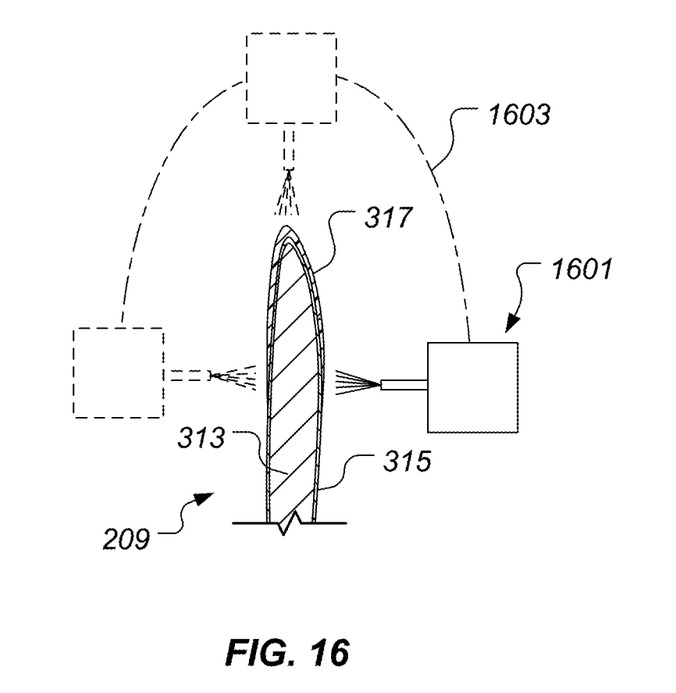
FIG. 16 is a schematic view of a spray machine applying a coating on a rotor blade.

Referring now again to FIG. 7, method 701 continues with a step 707 for programming a robotic spray machine with the information from the erosion surface model map generated in process 705. More specifically, the robotic spray machine is programmed to spray the coating onto the surface substrate of the rotor blade in accordance with the desired coating footprint and thickness, as included in the erosion surface model map. A step 709 includes applying the erosion coating with the spray machine. Referring briefly to FIG. 16, a spray machine 1601 is illustrated. Spray machine 1601 is configured to follow a specified spray path, such as a spray path 1603, for example. Further, spray machine 1601 is configured to deposit the cermet coating material on skin member 315 in accordance with a desired tapered thickness and footprint, both in the chordwise and spanwise directions, so as to form coating 317.

Figure 9:
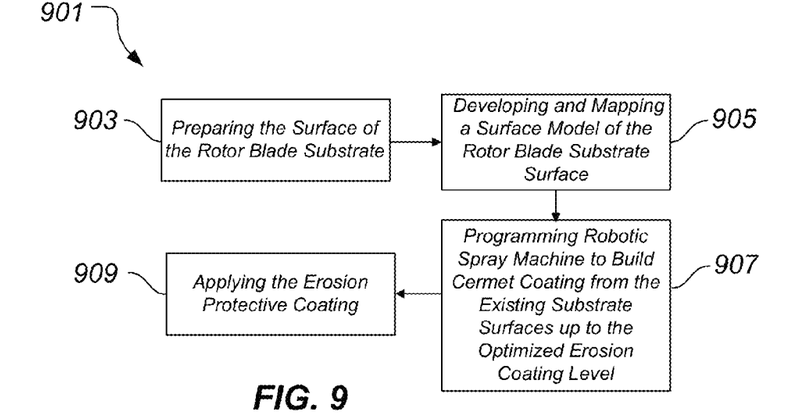
FIG. 9 is a schematic view of a method, according to the present application.

Referring now to FIG. 9, a method 901 of selectively repairing/reapplying the erosion protective coating is schematically illustrated. It can be desirable to take an existing rotor blade, that has been operational, and initially apply, repair, and/or reapply erosion protective coating 317. Method 901 includes a step 903 for preparing the surface of the substrate. The substrate, or outer surface of rotor blade 209, can be prepared by a rather light grit blasting, or even just wiping down the surface with solvent or other cleaning solution. In some embodiments, step 903 is unnecessary due to the ability of the cermet coating to bond well to a variety of substrate materials.

Method 901 further includes a step 905 of developing and mapping a surface model of the rotor blade substrate surface. When the rotor blade is in service, the rotor blade typically incurs erosion and possible damage that is unique to itself. As such, step 905 includes mapping a surface model unique to the specific rotor blade by measuring the contour surface of the substrate. In the preferred embodiment, a laser mapping or coordinate measuring machine is used to map the surface and integrate the measurement information into a surface model.

Method 901 further includes a step 907 for programming the robotic spray machine to build cermet coating from the existing substrate surfaces, as measured in step 905, up to the optimized erosion coating level. A process 705, discussed herein with regard to FIG. 8, is used to develop an erosion surface model map representing the optimized erosion coating pattern and thickness. Step 907 involves programming the spray machine to apply the coating so as to achieve the optimized erosion coating pattern and thickness. For example, step 907 involves programming the spray machine to apply the coating to build a coating layer from the existing substrate surface up to the level of the optimized erosion coating pattern and thickness. Further, a step 909 includes applying the coating to the substrate of the rotor blade with the spray machine, such as spray machine 1601 (shown in FIG. 16).

Figure 11:
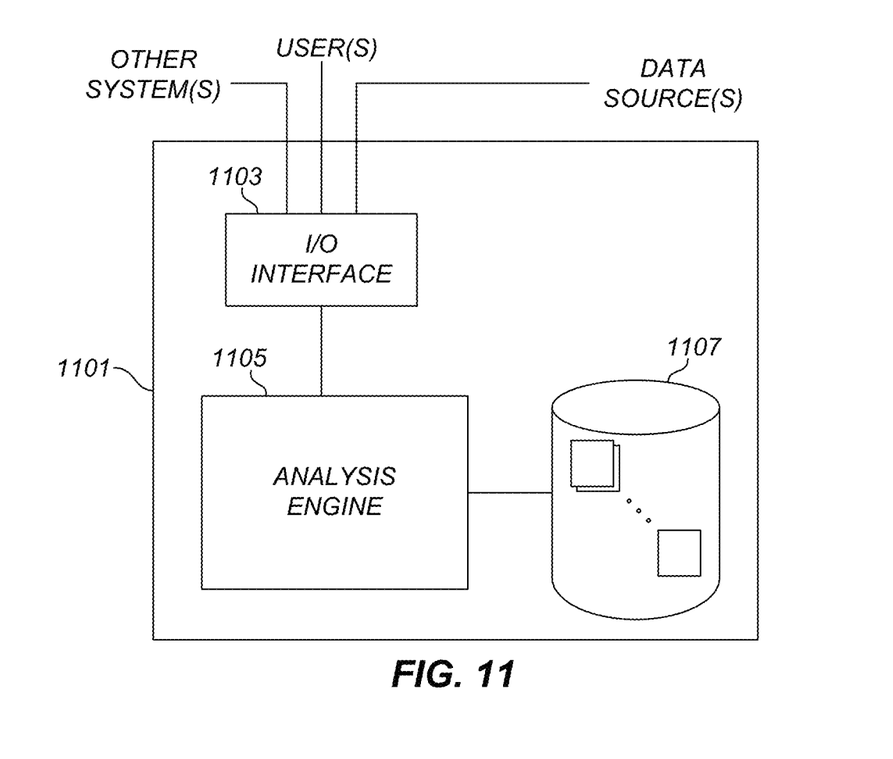
FIG. 11 is a schematic block diagram of an embodiment of a system, according to an illustrative embodiment of the present application.

Referring now to FIG. 11, a computer system 1101 is schematically illustrated. System 1101 is configured for performing one or more functions with regard to method 701, process 705, and method 901, as well as any other method or process described herein.

The system 1101 can include an input/output (I/O) interface 1103, an analysis engine 1105, and a database 1107. Alternative embodiments can combine or distribute the input/output (I/O) interface 1103, analysis engine 1105, and database 1107, as desired. Embodiments of the system 1101 can include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1103 provides a communication link between external users, systems, and data sources and components of the system 1101. The I/O interface 1103 can be configured for allowing one or more users to input information to the system 1101 via any known input device. Examples can include a keyboard, mouse, touch screen, and/or any other desired input device. The I/O interface 1103 can be configured for allowing one or more users to receive information output from the system 1101 via any known output device. Examples can include a display monitor, a printer, and/or any other desired output device. The I/O interface 1103 can be configured for allowing other systems to communicate with the system 1101. For example, the I/O interface 1103 can allow one or more remote computer(s) to access information, input information, and/or remotely instruct the system 1101 to perform one or more of the tasks described herein. The I/O interface 1103 can be configured for allowing communication with one or more remote data sources. For example, the I/O interface 1103 can allow one or more remote data source(s) to access information, input information, and/or remotely instruct the system 1101 to perform one or more of the tasks described herein.

The database 1107 provides persistent data storage for system 1101. While the term "database" is primarily used, a memory or other suitable data storage arrangement may provide the functionality of the database 1107. In alternative embodiments, the database 1107 can be integral to or separate from the system 1101 and can operate on one or more computers. The database 1107 preferably provides non-volatile data storage for any information suitable to support the operation of the system 1101, including various types of data discussed further herein.

The analysis engine 1105 is configured for calculating and predicting erosion wear rates, mapping predicted wear rates onto a surface model, as well as transforming the mapped erosive wear rates into an erosion surface model map of a coating footprint and thickness, as well as other concepts disclosed herein. For example, the analysis engine 1105 can be configured to perform methods 701 and 901, as discussed further herein. The analysis engine 1105 can include various combinations of one or more processors, memories, and software components.

Figure 12:
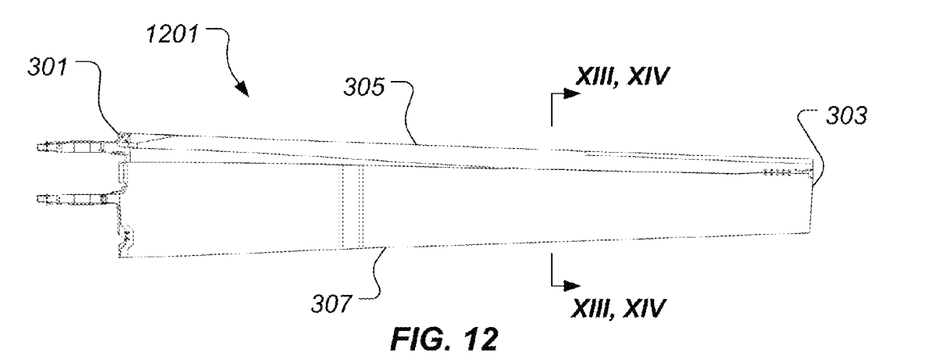
FIG. 12 is a top view of a rotor blade, according to an embodiment of the present application.
Figure 13:
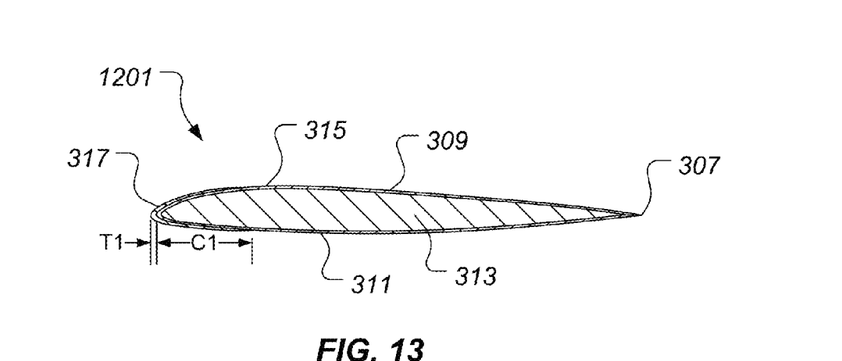
FIG. 13 is a cross-sectional view, taken at section lines XIII-XIII in FIG. 12.
Figure 14:
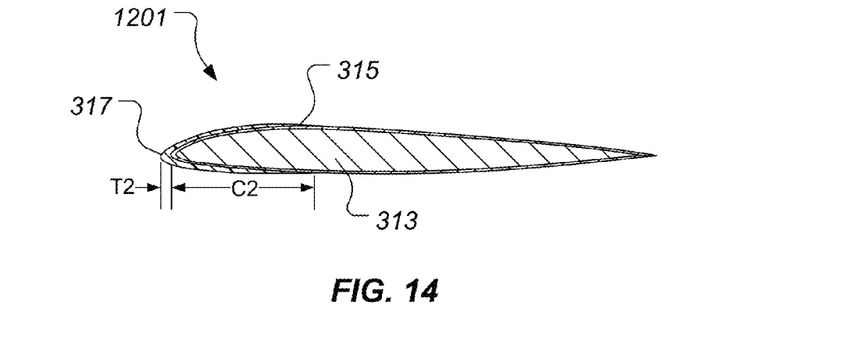
FIG. 14 is a cross-sectional view, taken at section lines XIV-XIV in FIG. 12.

Referring now to FIGS. 12-14, a rotor blade 1201 is illustrated. Rotor blade 1201 is substantially similar to rotor blade 209. Cross-sectional views of rotor blade 1209 are illustrated in FIGS. 13 and 14 to further describe how the coating 317 can be configured for a desired life before needing repair. For example, coating 317 can be configured for any life period, such as 1000 operation hours, 2000 operational hours, 3000 operational hours, or any other life period. For exemplary purposes, FIG. 13 represents a coating 317 configured for 1000 operation hours, while FIG. 14 represents a coating 317 configured for 2000 hours. As shown, the coating 317 in FIG. 14 has a thickness T2 at the apex that is substantially greater than a thickness T1. Similarly, coating 317 extends from apex toward the trailing edge along the upper and lower airfoil surfaces at a chord length C2, which is greater than a chord length C1 in FIG. 13. Furthermore, FIGS. 13 and 14 illustrate the ability of coating 317 to be significantly tapered. For example, the thickness of coating 317 at the apex is approximately 5-10 times greater than the thickness of coating 317 near the terminating edges towards the chord center of rotor blade 1201.

Figure 15:
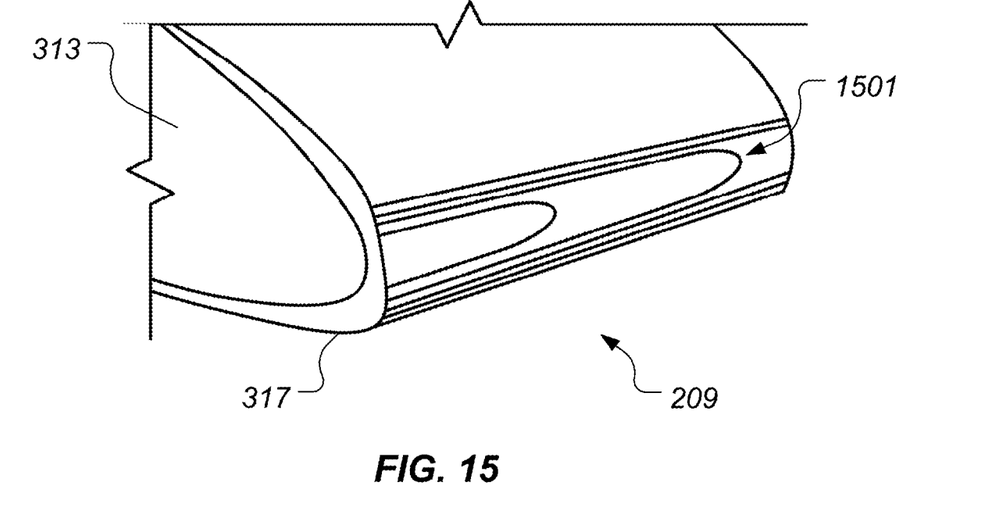
FIG. 15 is a perspective view of a portion of a rotor blade, according to the present application.

Referring now to FIG. 15, a portion of rotor blade 209 illustrated partially worn in order to illustrate how coating 317 is configured for visual wear inspection. During fabrication of coating 317, the spray machine makes incremental passes until the desired thickness is achieved. Each incremental pass creates a discreet layer. Erosive wear on coating 317, during operation of rotor blade 209, cause visible wear bands 1501. Each wear band 1501 represents wear through a single layer, and because each layer is of a known thickness, erosive wear can be visually determined by counting each wear band 1501. Thus coating 317 is configured for easy visual inspection. Furthermore, an alternative embodiment includes forming coating 317 with different coloring agents such that wear into a certain color visually communicates to an inspector that only a certain thickness of coating 317 remains or that a certain thickness of coating 317 has been eroded away.

Another feature of the system of the present application is that coating 317 can be selectively applied for the purposes of weight balancing. It may be desirable to selectively apply coating with the spray machine in certain areas of rotor blade 209 for the sole reason of changing the center of gravity or total weight of rotor blade 209.

The system of the present application provides significant advantages, including: (1) providing erosion protection that has an optimized footprint and tapered thickness, so to not add unnecessary weight to the rotor blade; (2) providing erosion protection in the form of a cermet coating that can be sprayed onto the rotor blade; (3) providing erosion protection system that is customizable to a desired life span; (4) providing an erosion protection system that is configured for selectively repairing/reapplying the erosion protective coating; and (5) providing a method of developing an erosion surface model map of an optimized erosion protective coating pattern and thickness.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A rotor blade comprising:
   a root end;
   a tip end;
   a skin member defining an airfoil surface, the airfoil surface having a leading edge surface, an upper airfoil surface, and a lower airfoil surface; and
   a cermet coating exterior to the skin member, the cermet coating being configured to protect the rotor blade against erosion during operation;
   wherein the cermet coating is tapered spanwise along the leading edge surface.

2. The rotor blade according to claim 1, wherein the cermet coating is tapered along a chordwise direction.

3. The rotor blade according to claim 1, wherein the cermet coating is tapered along a chordwise direction, such that a thickness of the cermet coating decreases as the distance from an apex of the leading edge surface increases, along the chordwise direction.

4. The rotor blade according to claim 1, wherein the cermet coating comprises approximately 80-90% tungsten carbide and 10-20% cobalt.

5. The rotor blade according to claim 1, wherein the cermet coating comprises approximately 80-90% tungsten carbide and 10-20% nickel.

6. The rotor blade according to claim 1, wherein a first thickness of the cermet coating near an apex of the leading edge surface is approximately five times a second thickness near the upper airfoil surface.

7. The rotor blade according to claim 1, wherein the cermet coating is applied on the upper airfoil surface at a greater chordwise distance from an apex of the leading surface as compared to the cermet coating applied on the lower airfoil surface.

8. The rotor blade according to claim 1, wherein the cermet coating is configured to visually detectable wear band upon an erosive wearing through a layer of the cermet coating.

9. A method of selectively applying an erosion protective coating on an airfoil surface, the method comprising:
   developing a map of an erosion coating pattern, comprising:
      calculating a predicted erosive wear rate about the airfoil surface;
      mapping the predicted erosive wear rate onto an erosion surface model, the erosion surface model being a representation of the airfoil surface;
      transforming the mapped predicted erosive wear rate into the map of the erosion coating pattern, the map being dependent in part upon the predicted erosive wear rate and a desired life of the erosion protective coating;
   applying the erosion protective coating on the airfoil surface.

10. The method according to claim 9, wherein the step of calculating the predicted erosive wear rate about the airfoil surface includes using test data from a test rotor blade to calculate the predicted erosive wear rate.

11. The method according to claim 9, wherein the step of calculating the predicted erosive wear rate about the airfoil surface includes using actual erosion data from an actual rotor blade to calculate the predicted erosive wear rate.

12. The method according to claim 9, wherein the step of calculating the predicted erosive wear rate about the airfoil surface includes at least one of the following:
   a rotor twist;
   a rotor speed data;
   an airfoil surface data; and
   a rotor diameter data.

13. The method according to claim 9, wherein the step of mapping the predicted erosive wear rate onto the erosion surface model includes using a three-dimensional graphic model.

14. The method according to claim 9, wherein the step of applying the erosion protective coating on the airfoil surface includes spraying a cermet material onto the airfoil surface.

15. The method according to claim 14, wherein the cermet material comprises tungsten carbide and nickel.

16. The method according to claim 9, wherein the step of applying the erosion protective coating on the airfoil surface includes using a spray machine, the spray machine being programmable.

17. A method of selectively applying an erosion protective coating on an airfoil surface, the method comprising:
   developing an erosion surface model of the airfoil surface, the erosion surface model representing a measurement of an existing surface geometry of the airfoil surface;
   developing a map of an erosion coating pattern, the erosion coating pattern being an indicative of a requisite footprint and thickness pattern of the erosion protecting coating suitable for enduring a certain amount of operation time; and applying the erosion protective coating to the airfoil surface so as to build the erosion protective coating between the existing surface geometry to coating levels dictated by the map of the erosion coating pattern.

18. The method according to claim 17, wherein the step of developing the erosion surface model of the airfoil surface includes measuring any surface damage on the airfoil surface.

19. The method according to claim 17, wherein the airfoil surface is the outer surface of a rotor blade.

* * * * *